United States Patent [19]
Porrka et al.

[11] Patent Number: 5,929,942
[45] Date of Patent: Jul. 27, 1999

[54] COMPUTER SYSTEM AND COMPUTER IMPLEMENTED PROCESS FOR EDITING VIDEO FIELDS

[75] Inventors: Joseph Porrka, Monona; Bruce Dawson, Madison, both of Wis.

[73] Assignee: Avid Technology, Inc., Tewksbury, Mass.

[21] Appl. No.: 08/833,277

[22] Filed: Apr. 4, 1997

[51] Int. Cl.$^6$ .......................... H04N 5/262; H04N 5/222
[52] U.S. Cl. .......................... 348/722; 348/448; 348/576; 348/613; 382/309
[58] Field of Search .......................... 348/722, 576, 348/577, 575, 578, 441, 448, 446, 911, 552, 671, 674, 675, 613, 910, 447, 439; 382/309; H04N 5/262, 5/222

[56] References Cited

U.S. PATENT DOCUMENTS

| | | | |
|---|---|---|---|
| 4,367,465 | 1/1983 | Mati et al. | 340/707 |
| 4,492,978 | 1/1985 | Thomas | 348/439 |
| 4,571,632 | 2/1986 | Schaphorst et al. | 348/439 |
| 4,782,397 | 11/1988 | Kimoto | 358/256 |
| 5,129,013 | 7/1992 | Holzmann et al. | 382/44 |
| 5,146,325 | 9/1992 | Ng | 348/439 |
| 5,181,113 | 1/1993 | Chang | 348/461 |
| 5,283,651 | 2/1994 | Ishizuka | 348/910 |
| 5,450,134 | 9/1995 | Legate | 348/467 |
| 5,510,843 | 4/1996 | Keene et al. | 348/447 |
| 5,532,751 | 7/1996 | Lui | 348/448 |
| 5,557,334 | 9/1996 | Legate | 348/473 |
| 5,600,376 | 2/1997 | Casavant et al. | 348/439 |
| 5,625,421 | 4/1997 | Faroudja et al. | 348/448 |
| 5,633,687 | 5/1997 | Bhayani et al. | 348/441 |
| 5,659,639 | 8/1997 | Mahoney et al. | 382/309 |
| 5,661,525 | 8/1997 | Kovacevic et al. | 348/448 |
| 5,663,765 | 9/1997 | Matsuse et al. | 348/448 |
| 5,703,654 | 12/1997 | Iizuka | 348/474 |
| 5,703,659 | 12/1997 | Tanaka | 348/576 |

*Primary Examiner*—John K. Peng
*Assistant Examiner*—Jean W. Désir
*Attorney, Agent, or Firm*—Wolf, Greenfield & Sacks, P.C.

[57] ABSTRACT

A computer implemented method for editing a video frame is disclosed. The video frame comprises scan lines of a first video field interlaced with scan lines of a second video field, and the scan lines comprise a plurality of pixels, each having values representing image information. The method comprises displaying the video frame on a display screen of a computer system, the computer system having a processor and input means which are coupled to the display screen, receiving an input from the input means which indicates which of the first and second video fields of the video frame is to be edited and in response to the input, de-emphasizing the scan lines of the video field which is not to be edited.

25 Claims, 5 Drawing Sheets

COMPUTER SYSTEM AND COMPUTER IMPLEMENTED PROCESS FOR EDITING VIDEO FIELDS

FIELD OF THE INVENTION

This invention is related to a method for editing video fields, and more particularly to a method for de-emphasizing one of the video fields which make up a video frame in order to allow more efficient editing of another video field in the video frame.

BACKGROUND OF THE INVENTION

In a video format, images are typically captured in a series of video fields. These video fields are made up of hundreds of horizontal scan lines, which are essentially "slices" of the image in the video field. Each scan line is made up of a plurality of pixels. The raw video data which forms the pixels is YUV data. Each pixel has varying YUV values which can be converted into varying red, blue and green (RGB) values which determine the color of each pixel. The RGB values are numeric values which indicate a level of each color which makes up the color of each pixel. In order to conserve bandwidth in the playback of the video images, consecutive fields may be interlaced to make one composite video frame from two consecutive video fields. Interlacing is done by vertically alternating horizontal scan lines from each consecutive field to form one video frame. In the NTSC video format, video images are captured at 60 fields per second. Interlacing two consecutive fields results in video which is transmitted at 30 frames per second. There are other video formats which have different scan rates, such as PAL, which has a scan rate of 50 fields per second or 25 frames per second.

Video field interlacing is schematically shown in FIG. 1A and FIG. 1B. FIG. 1A shows two consecutive video fields $A_1$, $A_2$. Each of the video fields $A_1$ and $A_2$ are made up of hundreds of horizontal scan lines which make up an image which is depicted in the field. In FIG. 1A, the scan lines which make up field $A_1$ are labeled $A_{L1}$, and the scan lines which make up field $A_2$ are labeled $A_{L2}$. As stated above, video fields for NTSC video are typically shot at approximately 60 fields per second. FIG. 1B schematically shows how fields $A_1$ and $A_2$ are interlaced to form video frame $A_{12}$. As shown in the figure, video frame $A_{12}$ comprises the scan lines $A_{L1}$ and $A_{L2}$ in an alternating fashion from the top of the frame to the bottom of the frame. This interlacing of video fields $A_1$ and $A_2$ results in a video transmission rate of approximately 30 frames per second.

Conventionally, once the video fields are interlaced, editing is performed either by displaying both fields, or by displaying just one field and doubling the scan lines to fill the frame.

Displaying both fields presents a problem because there is a slight timing offset between each field. Therefore, when the fields are interlaced to form the video frame, the image may be somewhat choppy or blurred due to the difference in time between the images in each field. During the editing process, objects which are moving in an image of the video field cannot be accurately outlined, because moving objects will be displayed in two separate locations in the frame, one location for each video field.

Doubling the scan lines of a field is done by a process called "scan doubling." In the process of scan doubling, each scan line in the video field is doubled, in order to fill the entire frame. The doubled field is then edited. However, since there is a difference in time between each video field, scan doubling tends to display data in the video frame which may be false or misleading, since it is compensating for the time offset between each video field. Scan doubling causes half of the spatial information of the frame to be lost because it is contained in the video field which is not shown in the scan doubled frame. This is particularly problematic when the fields contain still or slow moving objects, since the information which is lost is accurate information. This loss of data tends to make editing of the fields difficult, inaccurate and time consuming.

SUMMARY OF THE INVENTION

The present invention overcomes the limitations of the prior art by allowing the user to dim the scan lines of a first video field of the video frame while editing the scan lines of the second video field of the video frame. This allows all of the spatial information to be shown, while making it clear which of the video fields is being edited.

In one aspect of the invention, a computer implemented method for editing a video frame is disclosed. The video frame comprises scan lines of a first video field interlaced with scan lines of a second video field, and the scan lines comprise a plurality of pixels, wherein each pixel has a value representing image information, such as color values. The method comprises displaying the video frame on a display screen of a computer system, the computer system having a processor and input means which are coupled to the display screen, receiving an input from the input means which indicates which of the first and second video fields of the video frame is to be edited and, in response to the input, de-emphasizing the scan lines of the video field which is not to be edited. The step of de-emphasizing comprises scaling the values of the pixels of the scan lines of the video field which is not to be edited by dividing the values by a user-selected variable. The step of de-emphasizing may also comprise converting the values of the pixels of the scan lines of the video field which is not to be edited to corresponding grey-scale values. The method further comprises providing a graphical representation on the display screen of a means for enabling a user to select the variable.

According to another aspect of the invention, a method for editing a video frame is disclosed. The video frame comprises scan lines of a first video field interlaced with scan lines of a second video field. The method comprises de-emphasizing the scan lines of the first video field and editing an image depicted in the scan lines of the second video field. The de-emphasizing step comprises manipulating a brightness of the scan lines of the first video field. The de-emphasizing step may also comprise manipulating the color of the scan lines of the first video field.

DETAILED DESCRIPTION

Figure 1A:
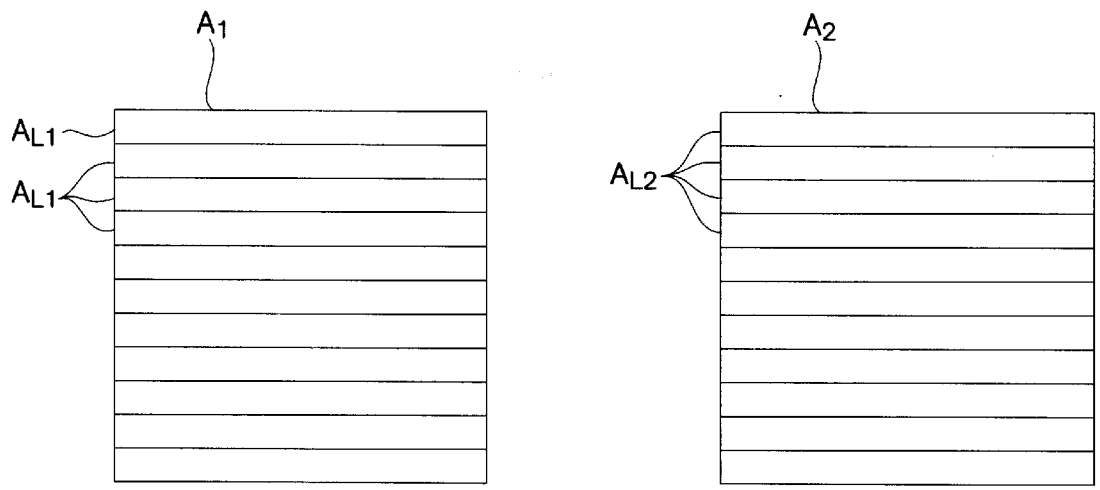
FIG. 1A is a schematic diagram which depicts two consecutive video fields.
Figure 1B:
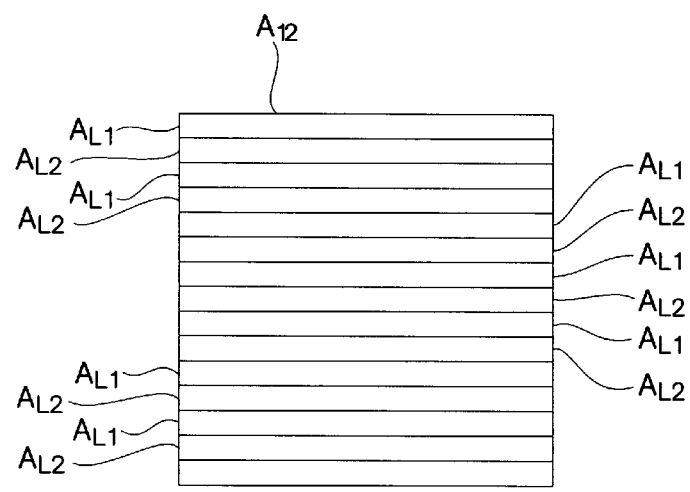
FIG. 1B is a schematic diagram which depicts the video fields of FIG. 1A interlaced to form a video frame.
Figure 2:
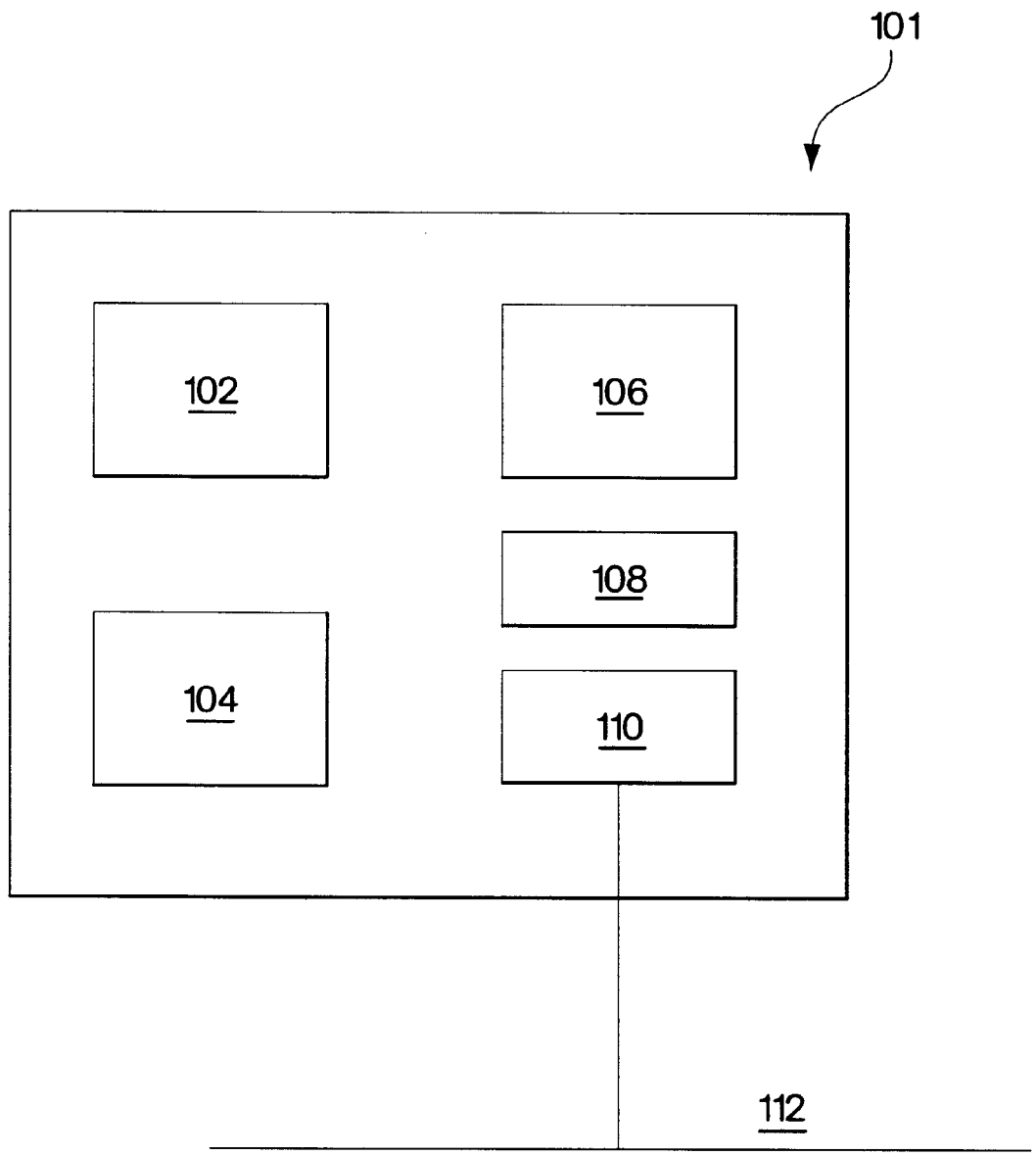
FIG. 2 is a schematic overview diagram of a computer system which is used in conjunction with the present invention.

An example of a computer system which may be used to practice the present invention is depicted in FIG. 2. The computer system 101 includes a processor 102, one or more storage devices 104, such as a disk drive, and a monitor 106. Computer system 101 typically includes a memory 108 for storing programs and data during operating of the computer system. The computer system may also contain one or more communication devices 110 that connect to a communication network 112. The invention may be embodied in editing software which could be stored on the disk drive, on a floppy disk or on a CD-ROM, for example.

Figure 3A:
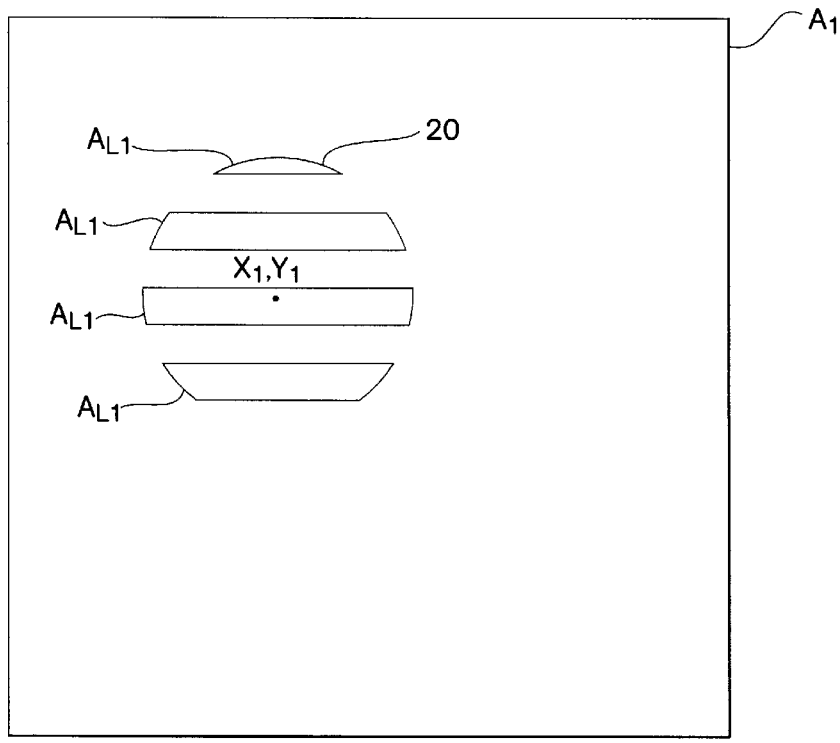
FIG. 3A is a schematic diagram showing a first video field including an image.
Figure 3B:
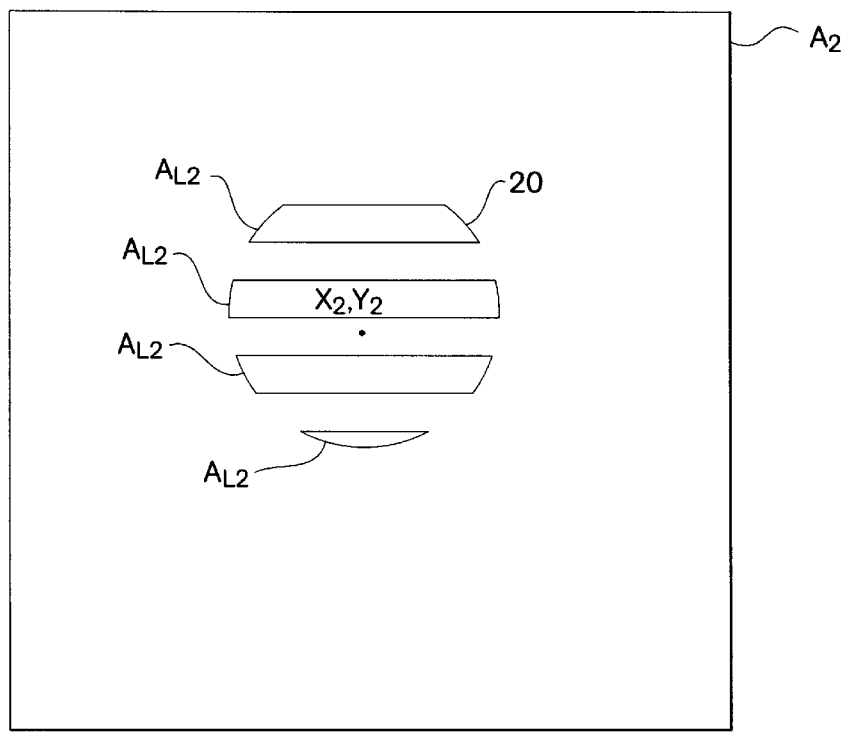
FIG. 3B is a schematic diagram showing a second video field including the image.

FIGS. 3A and 3B are schematic diagrams showing two consecutive video fields $A_1$, and $A_2$, each depicting an object 20 shot on video at 60 fields per second. In FIGS. 3A and 3B, the width of scan lines $A_{L1}$, and $A_{L2}$ has been greatly exaggerated to provide a more effective description of the invention. As described above, each video field comprises hundreds of scan lines. Object 20 is shown centered about coordinates $X_1$, $Y_1$ in video field $A_1$, of FIG. 3A. Object 20 is shown centered about coordinates $X_2$, $Y_2$ in video field $A_2$ of FIG. 3B. Since object 20 has changed positions in the 16.7 milliseconds between field $A_1$, and field $A_2$ (when shot at 60 fields per second), when fields $A_1$ and $A_2$ are interlaced, object 20 will be somewhat distorted in the resulting composite video frame.

Figure 4:
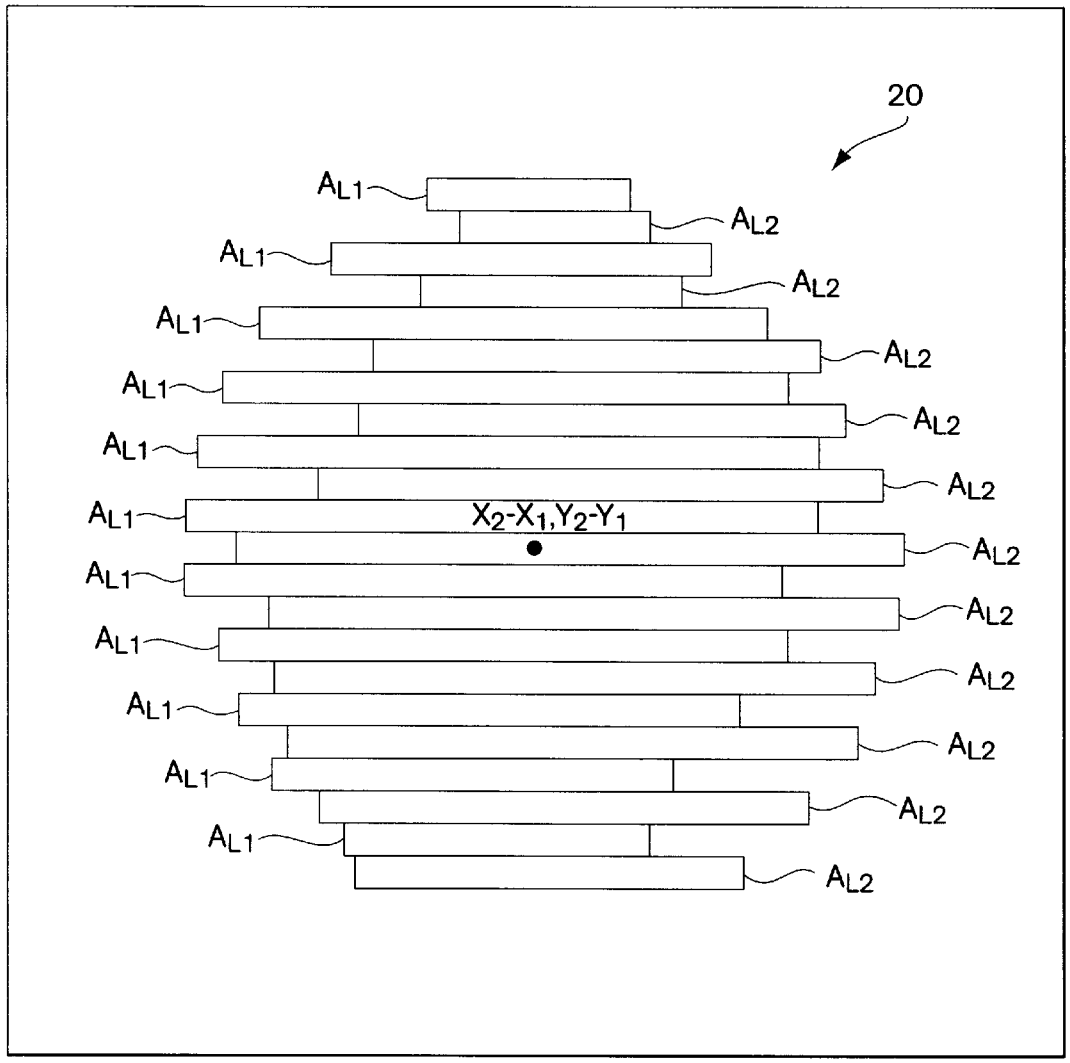
FIG. 4 is a schematic diagram showing the video fields of FIGS. 3A and 3B interlaced to form a composite video frame including the image.

FIG. 4 is schematic drawing showing video frame $A_{12}$, which comprises interlaced scan lines $A_{L1}$, from video field $A_1$, and $A_{L2}$, from video frame $A_2$. In this figure, the width of the scan lines $A_{L2}$ and $A_{L1}$ have been greatly exaggerated to provide more effective description of the present invention. As shown in FIG. 4, when video fields $A_1$ and $A_2$ are interlaced, object 20 is somewhat distorted and is centered about coordinates $X_2$–$X_1$, $Y_2$–$Y_1$.

In one aspect of the present invention, in order to edit object 20, one of the video field $A_1$, comprising scan lines $A_{L1}$, and the video field $A_2$, comprising scan lines $A_{L2}$ is de-emphasized to allow editing of the other video field. For example, when editing object 20 within video frame $A_{12}$, a user would first edit the portion of video frame $A_{12}$ comprising video field $A_1$. The field which is being edited is call the "primary" field. The field which is not being edited is called the "alternate" field. In this example, the video field $A_1$ is the primary field and the video field $A_2$ is the alternate field. Therefore, in order to edit the scan lines which make up the video field $A_1$, the scan lines which make up the video field $A_2$ are de-emphasized. This provides the user with a view of video field $A_1$ for editing, while also providing a de-emphasized view of video field $A_2$. In the preferred embodiment of the invention, this de-emphasis is performed by manipulating the brightness of the scan lines of the alternate field, while keeping the scan lines of the primary field at a normal brightness. Alternatively, the alternate field may be de-emphasized by removing the color from the scan lines which make up the alternate field, thereby displaying the primary field in color and the alternate field in greyscale, varying from black to white in color.

The alternate field is dimmed to allow the user to edit the primary field while viewing both fields. The editing of the primary field is done using editing software programs, such as the Elastic Reality software program from Avid Technologies, Inc. The brightness of the alternate field is dimmed by manipulating the values of the pixels of each scan line of the alternate field. If a pixel is represented using RGB format color information, the values of the pixels are manipulated by dividing each value by a variable chosen by the user. The alternate field may be dimmed anywhere between 0% where the alternate field is totally black, and 100%, where the alternate field has normal brightness. If the user desires to dim the alternate field to 50% of normal brightness, the RGB values are divided by 2. This results in the alternate field being half as bright as the primary field. This enables the user to more accurately edit the primary field while still being able to view both the primary field and the alternate field, thus allowing more precise editing of the composite video frame.

The brightness can be manipulated using known techniques which allow the user to adjust the brightness of the alternate field. For example, a menu item may be selected from a pulldown menu or a tool bar which causes a graphical representation to be displayed on the monitor which indicates the brightness of the alternate field and allows the user to adjust the brightness. Examples of such graphical representations are slide pots or knobs which may be manipulated using a computer pointing device.

Figure 5:
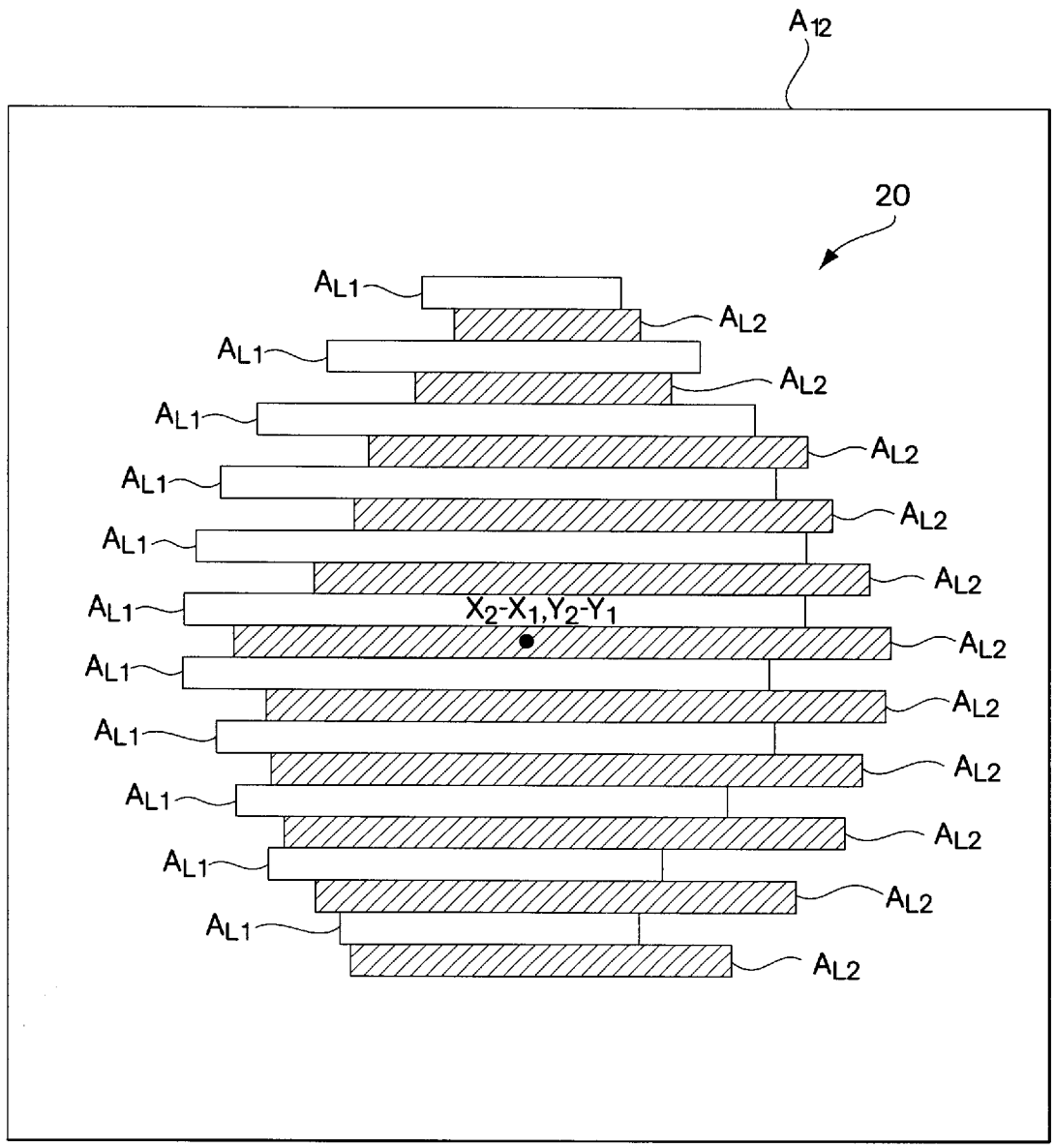
FIG. 5 is a schematic diagram showing the video frame of FIG. 4 with one of the video fields de-emphasized according to the present invention.

Once video fields $A_1$ and $A_2$ are interlaced to form video frame $A_{12}$, the user indicates which field is to be the primary field by indicating which scan line of the video frame $A_{12}$ is to be dimmed. For example, if the user were to indicate that the video field comprising the first scan line of the video frame were to be the primary field, every other scan line starting from the first scan line in the video frame would be kept at a normal brightness and every other scan line starting from the second scan line would be designated as part of the alternate field and would be dimmed according to the method described above. FIG. 5 is a schematic drawing showing video field $A_1$, as the primary field with its scan lines $A_{L1}$, at normal brightness, and video field $A_2$ as the alternate field with its scan lines $A_{L2}$ de-emphasized. Once the editing of video field $A_1$ is complete, video field $A_2$ is edited by returning its scan lines $A_{L2}$ to normal brightness and de-emphasizing the scan lines $A_{L1}$ of video filed $A_1$.

Having thus described an embodiment of the invention, various alterations, modifications, and improvements will readily occur to those skilled in the art. For example, ways of de-emphasizing the alternate video field other than manipulating the brightness and color of the field may be used in the present invention. Such alterations, modifications and improvements are intended to be within the spirit and scope of the invention. Accordingly, the foregoing description is by way of example only and is not intended to be limiting.

What is claimed is:

1. A computer implemented method for editing a video frame, the video frame comprising scan lines of a first video field interlaced with scan lines of a second video field, the scan lines comprising a plurality of pixels, wherein each pixel has a value representing image information, the method comprising:

displaying said video frame on a display screen of a computer system, the computer system having a processor and input means which are coupled to the display screen;

receiving an input from said input means which indicates which of said first and second video fields of said video frame is to be edited; and in response to said input, de-emphasizing the scan lines of the video field which is not to be edited.

2. The method of claim 1, wherein said step of de-emphasizing comprises scaling the values of the pixels of the scan lines of the video field which is not to be edited.

3. The method of claim 1, wherein the values of the pixels indicate color information, said step of de-emphasizing comprising converting the values of the pixels of the scan lines of the video field which is not to be edited to corresponding grey-scale values.

4. The method of claim 2, wherein the step of scaling comprises dividing the values of the pixels by a user-selected variable.

5. The method of claim 4, further comprising providing a graphical representation on said display screen of a means for enabling a user to select said variable.

6. A method for editing a video frame, the video frame comprising scan lines of a first video field interlaced with scan lines of a second video field, the method comprising:
de-emphasizing the scan lines of the first video field;
editing an image depicted in the scan lines of the second video field; and
displaying the video frame including the scan lines of the first and second video fields.

7. The method of claim 6, wherein said de-emphasizing step comprises manipulating a brightness of the scan lines of the first video field.

8. The method of claim 6, wherein said de-emphasizing step comprises manipulating the color of the scan lines of the first video field.

9. The method of claim 7, wherein said manipulating step comprises reducing the brightness the scan lines of the first video field.

10. The method of claim 8, wherein said manipulating step comprises removing the color from the scan lines of the first video field.

11. A method for editing a video frame, the video frame comprising scan lines of a first video field interlaced with scan lines of a second video field, the method comprising:
de-emphasizing the scan lines of the first video field; and
editing an image depicted in the scan lines of the second video field,
wherein said de-emphasizing step comprises manipulating a brightness of the scan lines of the first video field.

12. The method of claim 11, wherein said manipulating step comprises reducing the brightness the scan lines of the first video field.

13. A method for editing a video frame, the video frame comprising scan lines of a first video field interlaced with scan lines of a second video field, the method comprising:
de-emphasizing the scan lines of the first video field; and
editing an image depicted in the scan lines of the second video field,
wherein said de-emphasizing step comprises manipulating the color of the scan lines of the first video field.

14. The method of claim 13, wherein said manipulating step comprises removing the color from the scan lines of the first video field.

15. A method for editing a video frame, the video frame comprising a plurality of alternating video fields, the method comprising:
visually de-emphasizing a first of said plurality of alternating video fields;
editing a second of said plurality of video fields; and
displaying the video frame including the first and second video fields.

16. A method for editing a video frame, the video frame comprising a plurality of alternating video fields, the method comprising:
visually de-emphasizing a first of said plurality of alternating video fields;
editing a second of said plurality of video fields,
wherein said step of de-emphasizing comprises dimming said first video field.

17. The method of claim 16, wherein said dimming step comprises dividing the values of said first video field by a variable.

18. A method for editing a video frame, the video frame comprising a plurality of alternating video fields, the method comprising:
visually de-emphasizing a first of said plurality of alternating video fields;
editing a second of said plurality of video fields,
wherein said step of de-emphasizing comprises removing color from said first of said plurality of alternating video fields.

19. A computer implemented method for editing a video field of a video frame, the video frame comprising scan lines of a first video field interlaced with scan lines of a second video field, the scan lines comprising a plurality of pixels, wherein each pixel has a value representing image information, the method comprising:
displaying said video frame on a display screen of a computer system, the computer system having a processor and input means which are coupled to the display screen;
receiving an input from said input means which indicates which of said first and second video fields of said video frame is to be edited; and
in response to said input, de-emphasizing the scan lines of the video field which is not to be edited.

20. A computer system having a display screen, input means, and a memory unit that are coupled to a processor of the computer system, the memory unit having stored therein a set of video-frame editing instructions for execution by the processor, the instructions constructed and arranged for editing a video frame, the video frame comprising scan lines of a first video field interlaced with scan lines of a second video field, the scan lines comprising a plurality of pixels, wherein each pixel has a value representing image information, the computer system comprising:
means for displaying said video frame on the display screen;
means for receiving an input from the input means that indicates which of said first and second video fields of said video frame is to be edited; and
means, operative in response to said input, for de-emphasizing the scan lines of the video field that is not to be edited.

21. The computer system of claim 20, wherein said de-emphasizing means comprises means for scaling the values of the pixels of the scan lines of the video field that is not to be edited.

22. The computer system of claim 20, wherein the values of the pixels indicate color information, the de-emphasizing means comprising means for converting the values of the pixels of the scan lines of the video field that is not to be edited to corresponding grey-scale values.

23. A computer program product for use with a computing system having a display screen, input means, and a memory unit that are coupled to a processor of the computer system, the computer program product comprising a computer usable medium having embodied therein computer-readable program code method steps that, when executed, enable a user to edit a video frame, the video frame comprising scan lines of a first video field interlaced with scan lines of a second video field, the scan lines comprising a plurality of pixels, wherein each pixel has a value representing image information, the method steps comprising:

(1) displaying said video frame on the display screen;

(2) receiving an input from the input means that indicates which of said first and second video fields of said video frame is to be edited; and (3) in response to said input, de-emphasizing the scan lines of the video field that is not to be edited.

24. The computer program product of claim 23, wherein said step of de-emphasizing comprises scaling the values of the pixels of the scan lines of the video field that is not to be edited.

25. The computer program product of claim 23, wherein the values of the pixels indicate color information, said step of de-emphasizing comprising converting the values of the pixels of the scan lines of the video field that is not to be edited to corresponding grey-scale values.

* * * * *

UNITED STATES PATENT AND TRADEMARK OFFICE
CERTIFICATE OF CORRECTION

PATENT NO. : 5,929,942
DATED : July 27, 1999
INVENTOR(S) : Joseph Porrka, et al.

It is certified that error appears in the above-identified patent and that said Letters Patent is hereby corrected as shown below:

On the title page item [75], the first inventor will be changed from "Porrka" to --Porkka--.

Signed and Sealed this

Eighth Day of February, 2000

Attest:

Q. TODD DICKINSON

*Attesting Officer*    *Commissioner of Patents and Trademarks*